United States Patent [19]

Best

[11] 4,046,008
[45] Sept. 6, 1977

[54] FLUIDIC TEMPERATURE SENSOR

[75] Inventor: Stanley Gordon Best, Manchester, Conn.

[73] Assignee: United Technologies Corporation, Hartford, Conn.

[21] Appl. No.: 640,994

[22] Filed: Dec. 15, 1975

[51] Int. Cl.² .................. G01K 11/24; G01K 11/26
[52] U.S. Cl. ............................ 73/349; 73/346
[58] Field of Search ............ 73/349, 357, 339 A, 73/346; 137/804

[56] References Cited

U.S. PATENT DOCUMENTS

| 3,491,797 | 1/1970 | Taplin | 73/349 |
|---|---|---|---|
| 3,620,081 | 11/1971 | Black | 73/349 |
| 3,621,453 | 11/1971 | Ringwall | 73/339 A |
| 3,651,639 | 3/1972 | Black | 73/339 A |
| 3,805,614 | 4/1974 | Walliser | 73/339 A |

Primary Examiner—S. Clement Swisher
Assistant Examiner—Denis E. Corr
Attorney, Agent, or Firm—John D. Del Ponti

[57] ABSTRACT

A fluidic oscillator temperature sensor assembly for determining the average temperature of a stream of flowing gas in a conduit such as the turbine inlet of a gas turbine engine comprises a source of pressurized gas, a fluid amplifier connected to the source for utilizing the pressurized gas as a power stream, at least one feedback tube adapted for support across a desired cross-sectional area of the conduit connected to the fluid amplifier for oscillating the flow of the power stream at a frequency varying directly as a function of the temperature in the feedback tube, the feedback tube having a plurality of perforations along its length for admitting the flowing gas into the feedback tube to render the temperature therein substantially identical with the average temperature of the flowing gas and means for sensing the frequency to determine the average temperature.

10 Claims, 3 Drawing Figures

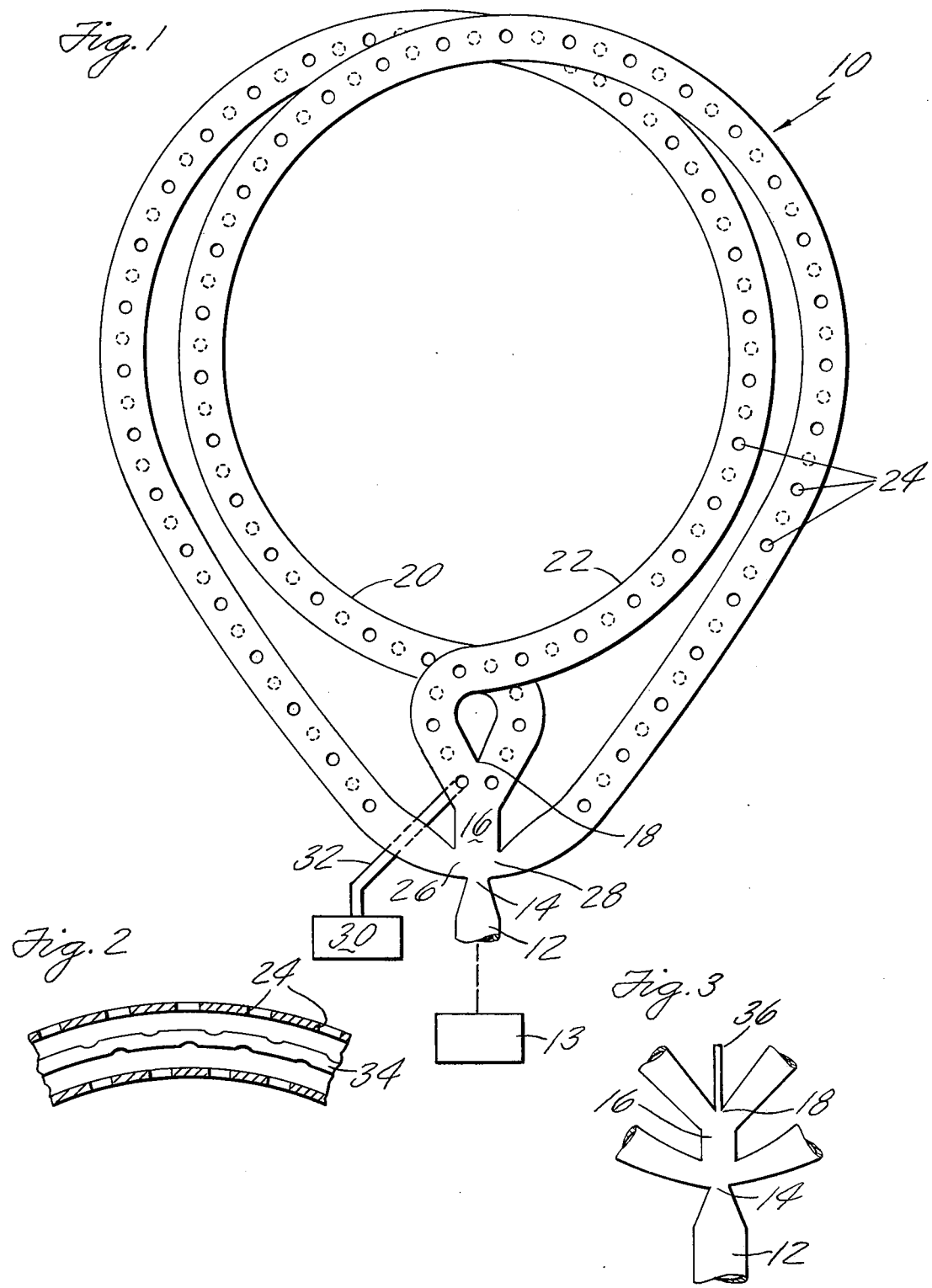

FLUIDIC TEMPERATURE SENSOR

BACKGROUND OF THE INVENTION

The present invention relates to temperature sensors and more particularly to a fluidic oscillator temperature sensor assembly.

Fluidic temperature sensor oscillators are known in the art. In general, they employ relatively short feedback paths and sense the temperature of the incoming fluid to the powerjet nozzle, rather than separately establishing temperature in the feedback path of the amplifier. In short, they are capable of measuring only "point" temperature, whereas the temperature which is often desired to be measured is an average temperature. Great difficulty is encountered in effectively averaging a multiplicity of point measurements with such devices. Further, the frequencies of practically sized devices are so high as to make the signals difficult to transmit and process, particularly when mated with fluidic control devices. In addition, flow velocity affects oscillating frequency in conventional fluidic temperature sensor oscillators and, as a result, causes undesirable sensitivity to changes in operating pressure levels.

SUMMARY OF THE INVENTION

It is a general object of the present invention to provide a fluid oscillator temperature sensor which measures the average temperature of a flowing fluid.

In accordance with the present invention, there is contemplated a method and means for determining the average temperature of a stream of flowing fluid. According to one aspect of the present invention the fluidic oscillator temperature sensor includes a conventional fluid amplifier in combination with at least one perforated feedback tube which is adapted for support in the stream of flowing gas. In a preferred embodiment, the amplifier includes a power stream nozzle, a splitter downstream of the nozzle, a pair of outlets downstream of the splitter and a pair of control ports disposed, one in opposition to the other, intermediate the power stream nozzle and the splitter. A pair of feedback tubes, each having a plurality of perforations along their length for ingress and egress of the flowing gas, connect the outlets to the control nozzles. Means supplying pressurized gas to the power stream nozzle are provided for producing a frequency output of oscillating pressure in the oscillator, as are means for sensing the frequency output.

According to another aspect of the invention, a preferred method for determining the average temperature of the fluid stream flowing in a conduit comprises disposing a fluid amplifier adjacent the conduit, providing a feedback circuit in the conduit for the fluid amplifier, flowing the stream into the feedback circuit at a plurality of points to render the temperature therein essentially identical with the average temperature of the stream, supplying pressurized gas to the fluid amplifier for introduction therein as a power stream which is oscillated in the feedback circuit at a frequency varying directly as a function of the temperature in the feedback circuit, and sensing the frequency to determine the average temperature. The feedback circuit is preferably a pair of tubes having a plurality of perforations distributed along their length and together with said amplifier forms a fluidic oscillator.

BRIEF DESCRIPTION OF THE DRAWING

An understanding of the invention will become more apparent to those skilled in the art by reference to the following detailed description when viewed in light of the accompanying drawings, wherein:

FIG. 1 is a plan view of the fluidic temperature sensor assembly of the present invention;

FIG. 2 is a fragmentary plan view, in partial section, showing a modification to the present invention; and FIG. 3 is a fragmentary plan view showing another modification to the present invention.

DESCRIPTION OF THE PREFERRED EMBODIMENT

In the drawing is shown a simplified fluidic oscillator temperature sensor assembly 10 which is adapted to be supported adjacent a stream of gas flowing in a plane perpendicular to the direction of flow of the gas. In general, the assembly 10 includes a pressurized gas source means, a conventional fluid amplifier, a pair of perforated feedback tubes and a frequency sensing means. The fluid amplifier portion of the assembly is typically formed of a plurality of flat plates sandwiched together in sealed, fluid-tight relationship with the middle plate being etched or cut out to form channels for the power stream and the output streams. The fluid amplifier may be of any nonmovable-part type, but is preferably of the jet deflection logic type, such as the well-known bistable or proportional fluid amplifiers. In addition, the amplifier may be in the form of multiple stages. As shown in the drawings as a preferred embodiment, a single stage bistable fluid amplifier is comprised of an inlet passageway 12 connected at one end to a pressurized gas supply source 13 and forming at the other end a powerjet nozzle 14. The inlet passageway 12 and nozzle 14 inject a high energy stream of fluid, conventionally referred to as a power stream, into a chamber 16. On the downstream end of chamber 16 is a splitter 18 for providing dual outlets for the power stream.

A pair of feedback tubes 20 and 22 adapted to be supported across a desired cross-sectional area of the conduit through which the gas whose temperature is to be measured is flowing, extend outwardly from the outlets in generally oppositely directed paths. As will be appreciated, the feedback tubes are in the form of a fluid logic Y and each feedback tube extends to control orifices or ports 26 and 28 on opposite sides of the chamber 16 so that the outlet stream passing through one feedback tube and its associated control port will deflect the power stream to the other outlet in the known cyclic manner. Although the feedback tubes are shown as taking a generally circular path, this, of course, is not critical and any configuration of convenience or efficiency may be employed. Along their length, the feedback tubes 20 and 22 are provided with perforations 24 to allow general lateral drift of the flowing hot gas into and out of each tube. The perforations are preferably located in a staggered relationship on the upstream and the downstream walls of the feedback tubes although they may be aligned and/or located anywhere on the tube walls. It is important to note that the size of the perforations, while large enough to permit lateral passage of the hot engine gas therethrough are small enough so that they do not excessively absorb the acoustic energy of the outlet stream.

As will be appreciated, the fluid amplifier and the feedback tubes making up the oscillator may be constructed of any material suitable for the environmental conditions of the gas whose flow is to be measured. For high temperature applications such as in the gas flow stream found in a turbine inlet, tailpipe or the like, the oscillator is preferably made of a high temperature, oxidation and corrosion resistant metal such as a nickel or cobalt superalloy. With respect to dimensions, feedback tubing of approximately ½–1 inch I.D. having perforations of approximately 1/16–⅛ inch diameter spaced ¾ inch apart is considered satisfactory.

As indicated previously, the power stream passes through the chamber 16, enters one or the other of the feedback tubes 20 and 22 and is regulated by the control stream issuing alternately from orifices or ports 28 and 26, respectively. The power stream flow direction is thus varied in a periodic manner by the control stream flows derived from the power stream flow itself to cause amplification and oscillation thereof. Since the frequency of these pressure oscillations is directly a function of the temperature of the gas in the feedback tubes and since the feedback tubes are perforated, these oscillations provide a frequency output directly denotative of the average temperature of the flowing gas in the turbine engine. Accordingly, these osciallations must be sensed. As will be appreciated, any know technique may be utilized. For example, a pressure transducer 30 having access to one of the outlets, as shown in the drawing, via tubing 32 to convert the pressure oscillations into electrical output signals whose frequency is directly related to the frequency of the pressure oscillations, is satisfactory. The electrical output signals are then converted to temperature.

It will be recognized by those skilled in the art that since the frequency of oscillation depends primarily upon the time required to propagate the outlet stream through the feedback tube, and since a 180° phase shift occurs in the amplifier itself, the feedback tubes should be designed to a length such that an approximately 180° phase shift occurs, the oscillations in pressure thus reinforcing and sustaining themselves. As a rule of thumb therefore, the tube length is designated to be approximately one-half wavelength of the expected frequency. In addition, instead of having a uniform distribution of perforations 24 as shown, the perforations may be disposed asymmetrically if a weighted or biased average temperature is desired. It is contemplated for example, that a greater number of perforations may be located in the regions of hottest gas with a lesser number in the regions of cooler gas.

Typically, when measuring turbine inlet temperature, the power stream is derived from engine compressor discharge air which is at a slightly higher pressure than burner pressure. If it is desired to increase this pressure differential, the invention may be modified as shown in FIG. 2 by providing each of the feedback tubes with a concentric perforated inner tube 34 which passes through the feedback tube and is vented to a lower pressure, e.g. atmosphere, in order to depress the feedback pressure level to a value intermediate burner pressure and atmospheric pressure. In such case, a portion of the gas flowing through the perforations 24 is drawn into the inner perforated tube 34.

In another modification shown in FIG. 3, the fluid amplifier, at the splitter 18, is provided with center vent tubing 36 to atmosphere. Because of the increased pressure differential provided by such an arrangement, rather than allowing the hot gases to pass into and then out of the feedback tubes via the perforations 24, the gases are sucked and retained therein. In this configuration, although amplifier gain is lowered and thus multistage amplification may be desirable or necessary, the effect of power jet supply fluid temperature is reduced to a minimum.

It will be appreciated that what has been described hereinabove, is apparatus and method for measuring an average, not a point, temperature. In contradistinction to prior fluidic temperature sensor oscillators which have employed very short feedback paths and have sensed the temperature of the incoming supply gas to the powerjet nozzle rather than separately establishing the temperature in a feedback path, the present invention produces the desired average reading with a single oscillator and a relatively low frequency due to the increased feedback path length. In addition, by virtue of the present invention, flow velocity effects have a negligible effect on oscillating frequency which is governed almost wholly by pressure wave propagation. Thus, the present devices is inherently insensitive to changes in operating pressure levels. Further, since the fraction of the total path subjected to flow from the powerjet nozzle is minimal, the present device is relatively insensitive to temperature of the supply fluid to the powerjet nozzle.

What has been set forth above is intended primarily as exemplary to enable those skilled in the art in the practice of the invention and it should therefore be understood that, within the scope of the appended claims, the invention may be practiced in other ways than as specifically described. It is contemplated, for example, that instead of two feedback tubes, a single perforated feedback tube may be provided between the two control ports of the fluid amplifier. It is also contemplated that the feedback tube may be broken into a number of series segments with some fluid amplification from each segment to the next in order to enhance signal to noise ratio by reducing attenuation to any single feedback tube. Further, atmospheric vents may be included at various points in the system.

I claim:

1. A fluidic oscillator temperature sensor assembly for determining the average temperature of a stream of flowing gas in a conduit comprising:
   a source of pressurized gas;
   fluid amplifier means connected to said source for introducing said pressurized gas into said fluid amplifier as a power stream;
   feedback tube means adapted for support across a desired cross-sectional area of said conduit connected to said fluid amplifier means for oscillating the flow of said power stream at a frequency varying directly as a function of the temperature in said feedback tube means, said feedback tube means having a length approximately one-half wavelength of the expected frequency and having a plurality of perforations along said length for admitting said flowing gas into said feedback tube means to render the temperature therein essentially identical with the average temperature of said flowing gas; and
   means for sensing said frequency for determining said average temperature.

2. A fluidic oscillator temperature sensor assembly for determining the average temperature of a stream of flowing gas in a conduit comprising:
   a source of pressurized gas;

jet deflection fluid amplifier means including an inlet, a pair of outlets, and a pair of control ports, said inlet being connected to said source for introducing said pressurized gas into said amplifier as a power stream;

feedback tube means adapted for support across a desired cross-sectional area of said conduit connected between said outlets and said control ports for oscillating the flow of said power stream between said outlets at a frequency varying directly with the square root of the temperature in said feedback tube means, said feedback tube means having a length approximately one-half wavelength of the expected frequency and having a plurality of perforations along said length for admitting said flowing gas into said feedback tube means to control the temperature therein; and means for sensing said frequency for determining said average temperature.

3. The invention of claim 2 wherein said feedback tube means comprises first and second feedback tubes, said first feedback tube connected at one end to one of said pair of outlets and at the other end to one of said pair of control ports and said second feedback tube connected at one end to the other of said pair of outlets and at the other end to the other of said pair of control ports.

4. The invention of claim 3 wherein said first and second feedback tubes each enclose a concentric perforated tube which is vented to a pressure lower than that of said flowing stream.

5. The invention of claim 3 wherein said fluid amplifier means is vented to a pressure lower than that of said flowing stream.

6. The invention of claim 3 wherein said perforations are distributed uniformly along the length of said first and second feedback tubes.

7. The invention of claim 3 wherein said perforations are distributed asymmetrically along the length of said first and second feedback tubes.

8. A method for determining the average temperature of a stream of fluid flowing in a conduit comprising:

disposing a fluid amplifier adjacent said conduit, said fluid amplifier including a feedback ciruit disposed in said conduit;

flowing said stream into said feedback circuit at a plurality of points to render the temperature therein essentially identical with the average temperature of said stream;

supplying pressurized gas to said fluid amplifier for introduction therein as a power stream, said power stream being oscillated in said feedback circuit at a frequency varying said feed back circuit having a length approximately one-half wavelength of the expected frequency;

9. The invention of claim 8 wherein said feedback circuit comprises a pair of tubes.

10. The invention of claim 9 comprising flowing said stream into said feedback tubes through a plurality of perforations disposed along their length.

* * * * *

UNITED STATES PATENT OFFICE
CERTIFICATE OF CORRECTION

PATENT NO. : 4,046,008
DATED : September 6, 1977
INVENTOR(S) : Stanley G. Best

It is certified that error appears in the above-identified patent and that said Letters Patent are hereby corrected as shown below:

Column 3, line 26    "osciallations" should be -- oscillations --

Column 3, line 27    "know" should be -- known --

Column 4, line 22    "devices" should be -- device --

Column 6, Claim 8, line 4    "ciruit" should be -- circuit --

Column 6, Claim 8, line 13   after "varying" the following should have been inserted -- directly as a function of the temperature in said feedback circuit --

Column 6, Claim 8, line 15   after "frequency;" the following should have been inserted -- and sensing said frequency to determine said average temperature. --

Signed and Sealed this

Twenty-fourth Day of January 1978

[SEAL]

Attest:

RUTH C. MASON
Attesting Officer

LUTRELLE F. PARKER
Acting Commissioner of Patents and Trademarks